United States Patent
Bickel et al.

(10) Patent No.: US 7,707,078 B2
(45) Date of Patent: Apr. 27, 2010

(54) METHOD AND APPARATUS FOR MAPPING DIMENSION-BASED ACCOUNTING ENTRIES TO ALLOW SEGMENT-BASED REPORTING

(75) Inventors: Steven D. Bickel, Thornton, CO (US); Michael R. Evans, Evergreen, CO (US)

(73) Assignee: Microsoft Corporation, Redmond, WA (US)

( * ) Notice: Subject to any disclaimer, the term of this patent is extended or adjusted under 35 U.S.C. 154(b) by 1797 days.

(21) Appl. No.: 10/810,261

(22) Filed: Mar. 26, 2004

(65) Prior Publication Data

US 2005/0216378 A1 Sep. 29, 2005

(51) Int. Cl.
*G07B 17/00* (2006.01)
(52) U.S. Cl. .......................................... 705/30
(58) Field of Classification Search ................ 705/30
See application file for complete search history.

(56) References Cited

U.S. PATENT DOCUMENTS

| | | | | |
|---|---|---|---|---|
| 2002/0138375 | A1* | 9/2002 | Kane et al. ............... | 705/30 |
| 2002/0156687 | A1* | 10/2002 | Carr et al. ............... | 705/26 |
| 2003/0046194 | A1* | 3/2003 | McClendon et al. ........ | 705/30 |
| 2004/0088232 | A1* | 5/2004 | Minnis, Jr. ............... | 705/30 |
| 2004/0230508 | A1* | 11/2004 | Minnis et al. ............ | 705/35 |
| 2005/0086125 | A1* | 4/2005 | Cirulli et al. ............ | 705/26 |
| 2005/0086135 | A1* | 4/2005 | Lu ....................... | 705/30 |
| 2005/0108163 | A1* | 5/2005 | Wells et al. ............. | 705/42 |
| 2006/0224474 | A1 | 10/2006 | Nelson et al. ............ | 705/30 |
| 2007/0179870 | A1* | 8/2007 | Goodbody et al. .......... | 705/30 |

OTHER PUBLICATIONS

The Analytic Engine for your Applications, http://www.thefillmoregroup.com/downloads/fillmore/DB2_OLAP_Tech_Overview_Sept_2000.pdf, Sep. 2000.
Tools for Traveling Data, http://www.dbmsmag.com/9706dlb.html, May 16, 1997.
Converting Data for Warehouses, http://www.dbmsmag.com/9706d15.html, May 16, 1997.
Standard Edition User's Guide, FRx Financial Reporting, 1989-2000 FRx Software Corporation, pp. 1-28.
Office Action of Jan. 4, 2008 in US-2006/0224474 filed Mar. 30, 2005.
Final Office Action of Jul. 24, 2008 in US-2006/0224474 filed Mar. 30, 2005.

* cited by examiner

*Primary Examiner*—Jagdish N Patel
*Assistant Examiner*—Sara Chandler
(74) *Attorney, Agent, or Firm*—Theodore M. Magee; Westman, Champlin, & Kelly, P.A.

(57) ABSTRACT

A method and apparatus are provided for mapping dimension-based financial data to allow segment-based reporting. The method includes selecting a set of dimensions from the dimension-based accounting data and defining an order for the selected dimensions to define a segment-based account code structure. The segment-based account code structure and the dimension-based data are then used to construct segment-based account codes that can be used in segment-based reporting.

10 Claims, 14 Drawing Sheets

FIG. 4

| | DATAAREA | |
|---|---|---|
| ID | ENTRY NAME | ISVIRTUAL |
| BMD | BENCHMARK | 0 |
| CAC | COSTACCOUNTING | 0 |
| CO1 | COMPANY1 | 0 |

FIG. 5

| | DIMENSIONS | | |
|---|---|---|---|
| ENTRY DESCRIPTION | ENTRY NAME | DIMENSION CODE | DATAAREAID |
| ADMINISTRATION/AM | AM | 0 | BMD |
| DISTRIBUTION/MGMT | DMUTR | 0 | BMD |
| CLIENT DINNERS | CLIENTMEALS | 1 | BMD |

600

DATA_DIMENSION_LENGTH

| DATAAREAID | DIMENSION CODE | FIELDNAME | DIMENSION DESCRIPTION | MAXLENGTH |
|---|---|---|---|---|
| BMD | -1 | ACCOUNTNUM | ACCOUNT | 8 |
| BMD | 0 | DIMENSION | DEPARTMENT | 5 |
| CAC | -1 | ACCOUNTNUM | ACCOUNT | 8 |
| CAC | 0 | DIMENSION | DEPARTMENT | 5 |
| CAC | 1 | DIMENSION2_ | REGION | 5 |

LEDGERBALANCESDIM

| DIMENSION | DIMENSION2_ | ... | DIMENSION10_ | ACCOUNTNUM | DEBITMST | CREDITMST |
|---|---|---|---|---|---|---|
| 2222 | WEST | ... | | 1534 | 1000 | |
| 9999 | WEST | ... | | 1110 | | -12000 |
| 9999 | SOUTH | ... | | 1110 | 5000 | |

FIG. 7

ENTITY 1500

| ENTITY NUM | ENTITY CODE | ENTITY DESC. |
|---|---|---|
| 1 | BMD | BMD-DEFAULT |
| 2 | CAC | CAC-DEFAULT |
| 3 | C01 | C01-DEFAULT |

SEGMENT_CTRL 1600

| ENTITY NUM | SEG-NUM | DIMENSION CODE | COLUMN NAME | SEG DESC. | SEG START POS. | SEG LENGTH |
|---|---|---|---|---|---|---|
| 1 | 1 | -1 | ACCOUNTNUM | LEDGER ACCOUNT | 1 | 6 |
| 1 | 2 | 0 | DIMENSION | DEPARTMENT | 7 | 3 |
| 1 | 3 | 1 | DIMENSION2_ | COST | 10 | 4 |

| ACCT_CODE | ENTITY_NUM | ACCT_DESC. | ACCOUNT CODE ||||||
| | | | ACCT_CODE ORIG | NAT_SEG | SEG01 CODE | SEG02 CODE | SEG03 CODE | ... | SEG10 CODE |
| 111TEST9999 | 2 | MAIN-TEST-DEPT | 111 | 111 | 111 | TEST | 9999 | ... | |
| 222TST2222 | 2 | SECOND-TST-DEP | 222 | 222 | 222 | TST2 | 2222 | ... | |

METHOD AND APPARATUS FOR MAPPING DIMENSION-BASED ACCOUNTING ENTRIES TO ALLOW SEGMENT-BASED REPORTING

BACKGROUND OF THE INVENTION

The present invention relates to financial and accounting software systems. In particular, the present invention relates to reporting tools used in conjunction with accounting software.

In early versions of accounting software, account numbers were used to associate financial data with particular accounts, such as a particular customer. To allow for more detailed accounting information, the concept of the account was extended by segmenting the account number so that different portions of the account number could be associated with specific entities within the company. For example, financial transactions performed by a particular department within the company or a particular sales person within the company could be assigned unique values within a segment of the account code. Thus, if the natural account number is 011, the department identifier is 52, and the sales person identifier is 48, an extended account code can be constructed as 0115248 to identify those financial transactions that are associated with the particular sales person in the particular department for the account. Accounting systems that use such account codes are known as segment-based accounting systems, because the account code can be divided into various segments to identify particular entities or attributes associated with the financial transaction.

Such segment based accounting systems have strict rules regarding the values that can be placed in each segment. In particular, the rules require that once the length of the segment has been defined, all of the entries placed in that segment must be of that length. Such restrictions make it difficult for some users to work with the accounting system.

As a result, dimension-based accounting systems were developed that gave the user more freedom in defining the attributes associated with an account. Under dimension-based accounting, financial transactions are identified by the natural account number and one or more user-defined dimensions. Each dimension is loosely defined such that there are no restrictions on the values that may be set for a dimension after the dimension is created. For example, a "Department" dimension can receive values of different lengths such as "52" and "claims" because there are no restrictions on the lengths of the entries for the dimension.

Reporting tools have been developed for segment-based accounting systems that rely on rigid definitions for the segments within the account codes. Because of the free-form nature of dimension-based accounting systems, the segment-based reporting tools have not been able to generate reports from dimension-based accounting data. Because of this, specialized reporting tools have been developed for dimension-based accounting. This requires users to use different reporting tools for different accounting systems, thereby increasing the learning burden on the user.

SUMMARY OF THE INVENTION

A method and apparatus are provided for mapping dimension-based financial data to allow segment-based reporting. The method includes selecting a set of dimensions from the dimension-based accounting data and defining an order for the selected dimensions to define a segment-based account code structure. The segment-based account code structure and the dimension-based data are then used to construct segment-based account codes that can be used in segment-based reporting.

BRIEF DESCRIPTION OF THE DRAWINGS

FIG. 4 is an example layout of a DATAAREA table under one embodiment of the present invention.

FIG. 5 is an example layout of a DIMENSIONS table under one embodiment of the present invention.

FIG. 6 is an example layout of a DATA DIMENSION LENGTH table under one embodiment of the present invention.

FIG. 7 is an example layout of a LEDGERBALANCES-DIM table under one embodiment of the present invention.

FIG. 15 is an example layout of an ENTITY table under one embodiment of the present invention.

FIG. 16 is an example layout of a SEGMENT CTRL table under one embodiment of the present invention.

FIG. 17 is an example layout of an ACCOUNT CODE table under one embodiment of the present invention.

DETAILED DESCRIPTION OF ILLUSTRATIVE EMBODIMENTS

Figure 1:
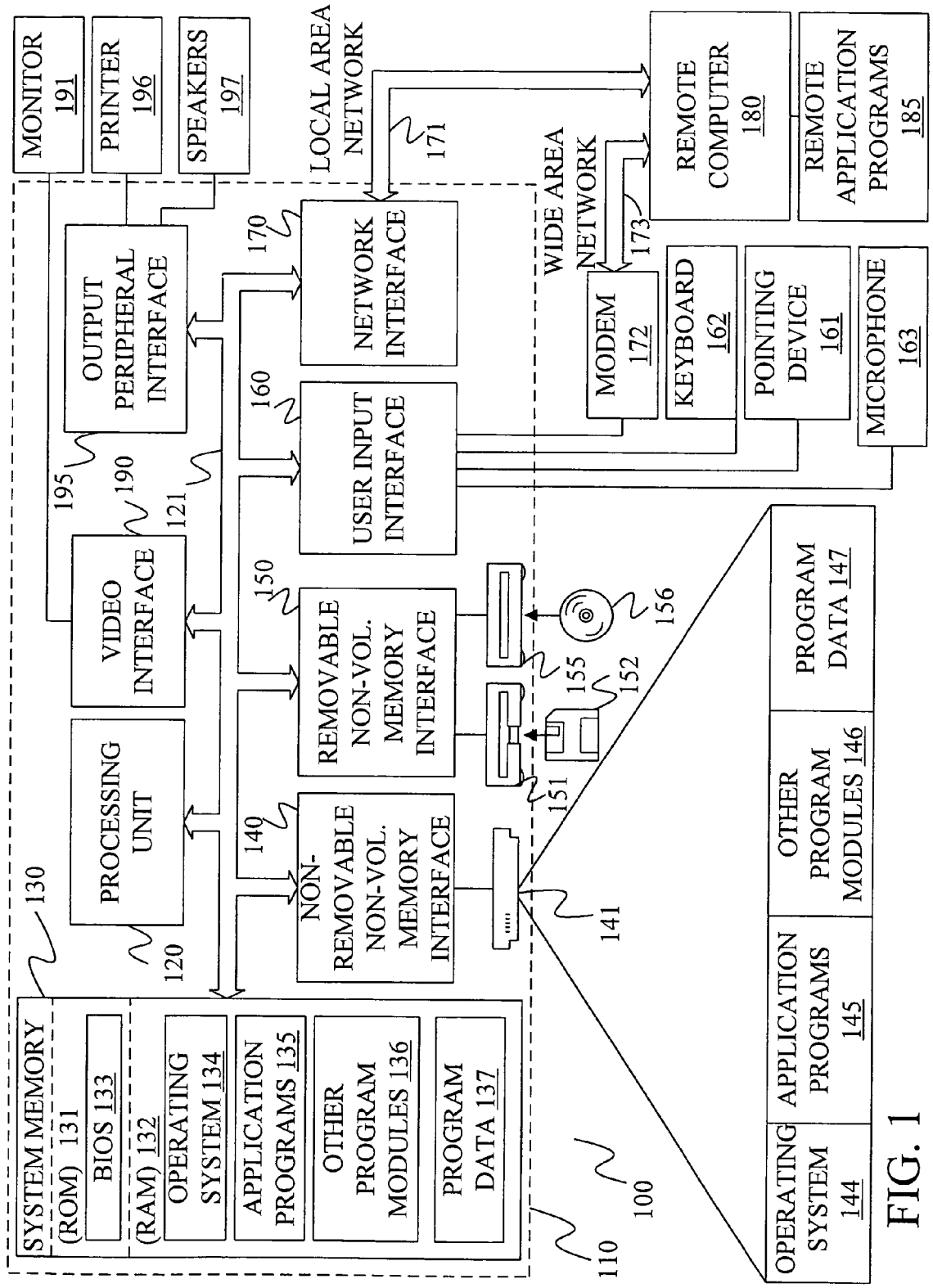
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
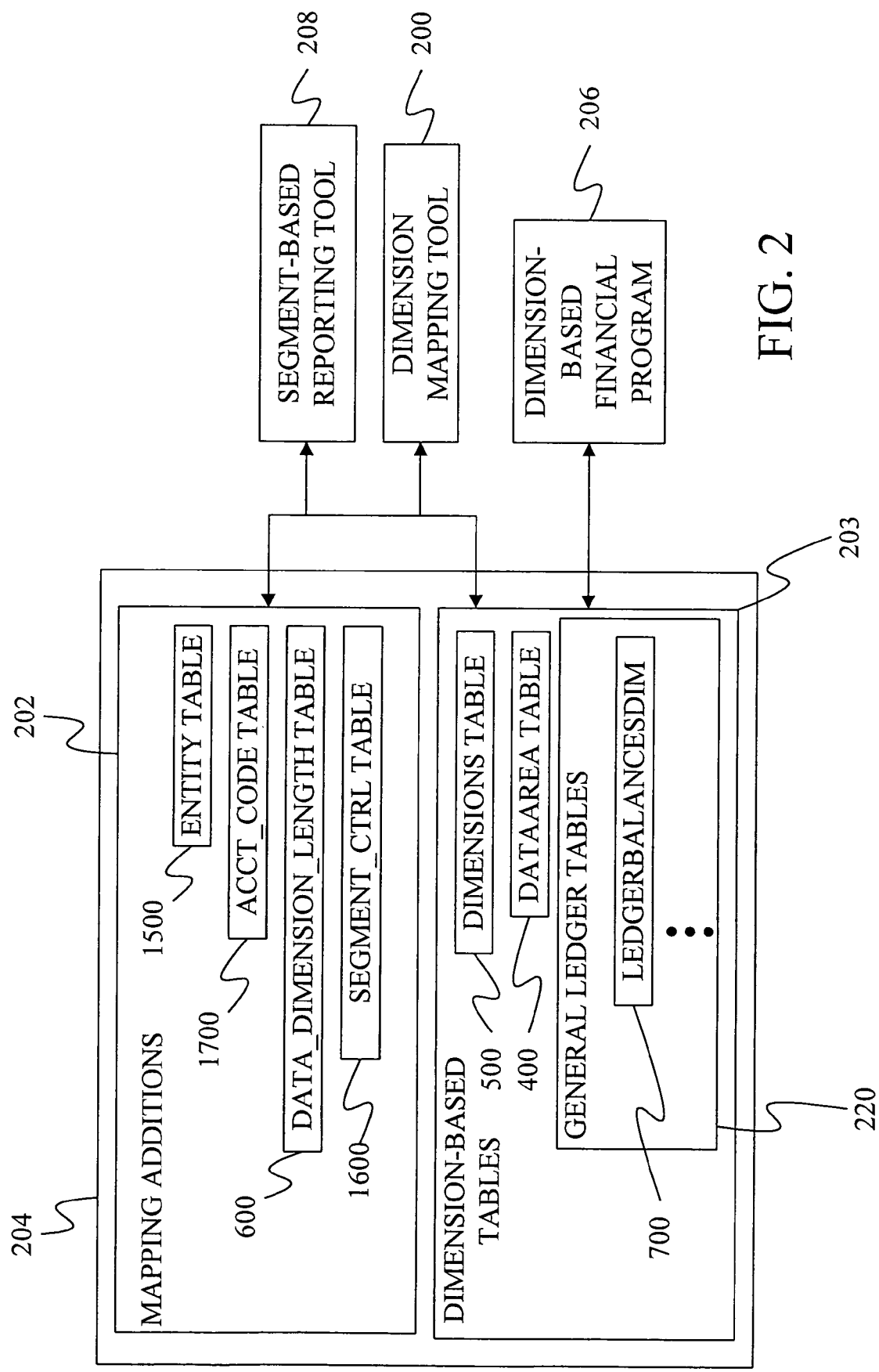
FIG. 2 is a block diagram of an embodiment of the present invention.

As shown in FIG. 2, the present invention provides a dimension mapping tool 200, which creates mapping additions 202 for a dimension database 204. Dimension database 204 contains dimension-based tables 203 created for a dimension-based financial program 206. Mapping additions 202 allow a segment-based reporting tool 208 to generate financial reports from data in dimension-based tables 203 by mapping the dimensions in the dimension-based tables into segments for one or more account codes.

Figure 3:
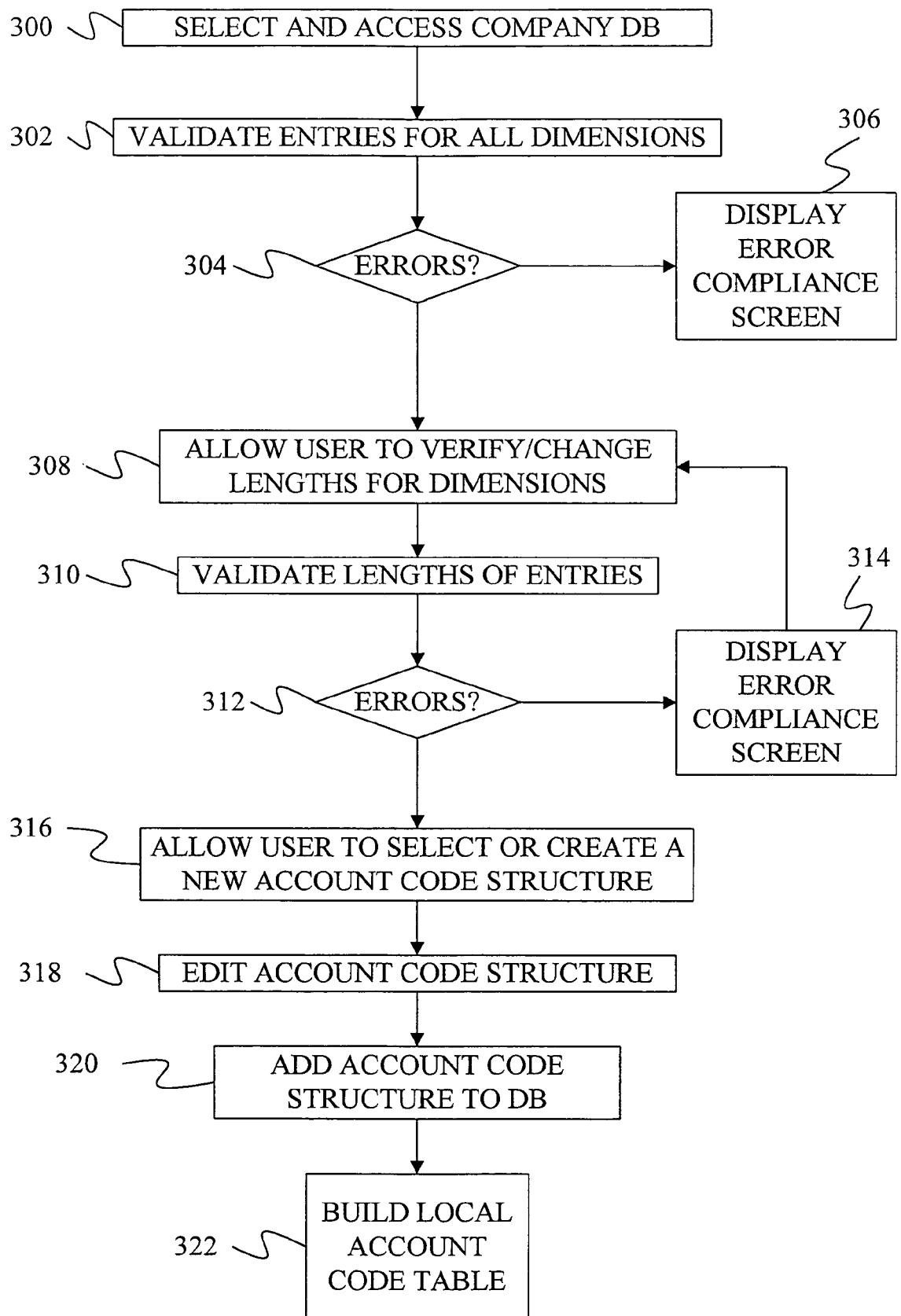
FIG. 3 is a flow diagram of a method of mapping dimension-based data into account codes to allow segment-based reporting.

FIG. 3 provides a method for forming mapping additions 202. At step 300 of FIG. 3, the user selects a database and a company found within the database. Under one embodiment, the companies available in a database are stored in a DATAAREA table 400 of FIG. 2. An example of a DATAAREA table 400 is shown in FIG. 4 and includes an ID field 402, an ENTRY NAME field 404 and a ISVIRTUAL field 406. ID field 402 provides a unique identifier for each company. ENTITY NAME 404 provides a more user-friendly name for the company. ISVIRTUAL field 406 indicates whether the company represents a true company or is a fictional company that is formed by combining information from one or more other companies.

At step 302 of FIG. 3, the process evaluates a set of dimension entries for the selected company. The dimension entries represent possible values for various dimensions defined in dimension-based tables 203. Under one embodiment, the dimension entries are stored in a DIMENSIONS table 500. As shown in FIG. 5, DIMENSIONS table 500 includes an ENTRY DESCRIPTION field 502, an ENTRY NAME field 504, a DIMENSION CODE field 506 and a DATAAREAID 508. DATAAREAID 508 indicates the company associated with this dimension entry. DIMENSION CODE 506 indicates the dimension associated with this dimension entry. ENTRY NAME 504 provides the name for this entry, and ENTRY DESCRIPTION 502 provides a user friendly description of the dimension entry. As shown in FIG. 5, there can be more than one dimension entry for a particular dimension. Thus, there are two entries for dimension code 0 in FIG. 5. In addition, the same dimension code may be used with different data area ID's. Thus, different companies can use the same dimension code. Similarly, different companies can use the same dimension entry names and entry descriptions.

During step 302, all of the entries in DIMENSIONS table 500 that have a DATAAREAID value that matches the company selected in step 300 are evaluated. In particular, the ENTRY NAME field is examined for each of the company's entries to determine if the entry name includes one of a set of invalid characters and whether the entry name exceeds a maximum length set for the entry name.

Under one embodiment, the set of invalid characters includes:
/\( );=,"!'−( )*&^#@$%{ }+?|
and the character sequence "http://". Thus, any entry name that includes one of these characters or the "http://" string is flagged as being in error. Each time an entry is flagged as being in error, it is added to a log of errors for the company.

The length of each entry name is compared to a length that is stored in a DATA DIMENSION LENGTH table 600 in the mapping addition section 202. As shown in FIG. 6, DATA DIMENSION LENGTH table 600 includes a DATAAREAID field 602, a DIMENSION CODE field 604, a FIELDNAME field 606, a DIMENSION DESCRIPTION field 608 and a MAXLENGTH field 610. DATAAREAID field 602 contains the company identifier associated with this dimension. DIMENSION CODE field 604 is the same as DIMENSION CODE field 506 of DIMENSIONS table 500. FIELDNAME field 606 contains the names of fields in dimension-based tables 203. Specifically, these field names are used as field headings in a set of General Ledger tables 220 to identify dimensions within General Ledger tables 220. For example, the field name "DIMENSION2⎯" would appear as a heading in a general ledger table such as LEDGERBALANCESDIM table 700.

DIMENSION DESCRIPTION field 608 of FIG. 6 includes a generic description for the dimension and MAXLENGTH field 610 includes the maximum length for the dimension.

When validating a dimension entry in DIMENSIONS table 500, the dimension code found in the DIMENSION CODE field of the dimension entry and the data area ID found in the DATAAREAID field of the dimension entry are used to search DATA DIMENSION LENGTH table 600. Upon finding an entry in DATA DIMENSION LENGTH table 600 that matches the data area ID and the dimension code of the dimension entry, the maximum length value from MAXLENGTH field 610 is retrieved. This maximum length value is then compared to the number of characters in the entry name found in ENTRY NAME field 504 of the dimension entry. If the number of characters in the entry name exceeds the maximum length, an error is generated and stored in the error log. Each entry in the error log includes identification information such as the entry name from ENTRY NAME field 504 and the dimension description from DIMENSION DESCRIPTION field 608 for the dimension associated with the dimension entry that was in error.

Step 302 also includes examining the ENTRY DESCRIPTION field of each of the company's entries in DIMENSIONS table 500 to determine if an entry description includes a null value. If a null value is found for an entry description, the description of the dimension from DIMENSION DESCRIPTION field 608 and the entry name from ENTRY NAME field 504 are stored in the error log along with an indication that the entry description for the entry had a null value.

At step 304, the method determines if there were any errors in the dimension entries. If there were errors, an error compliance screen is displayed at step 306.

Figure 8:
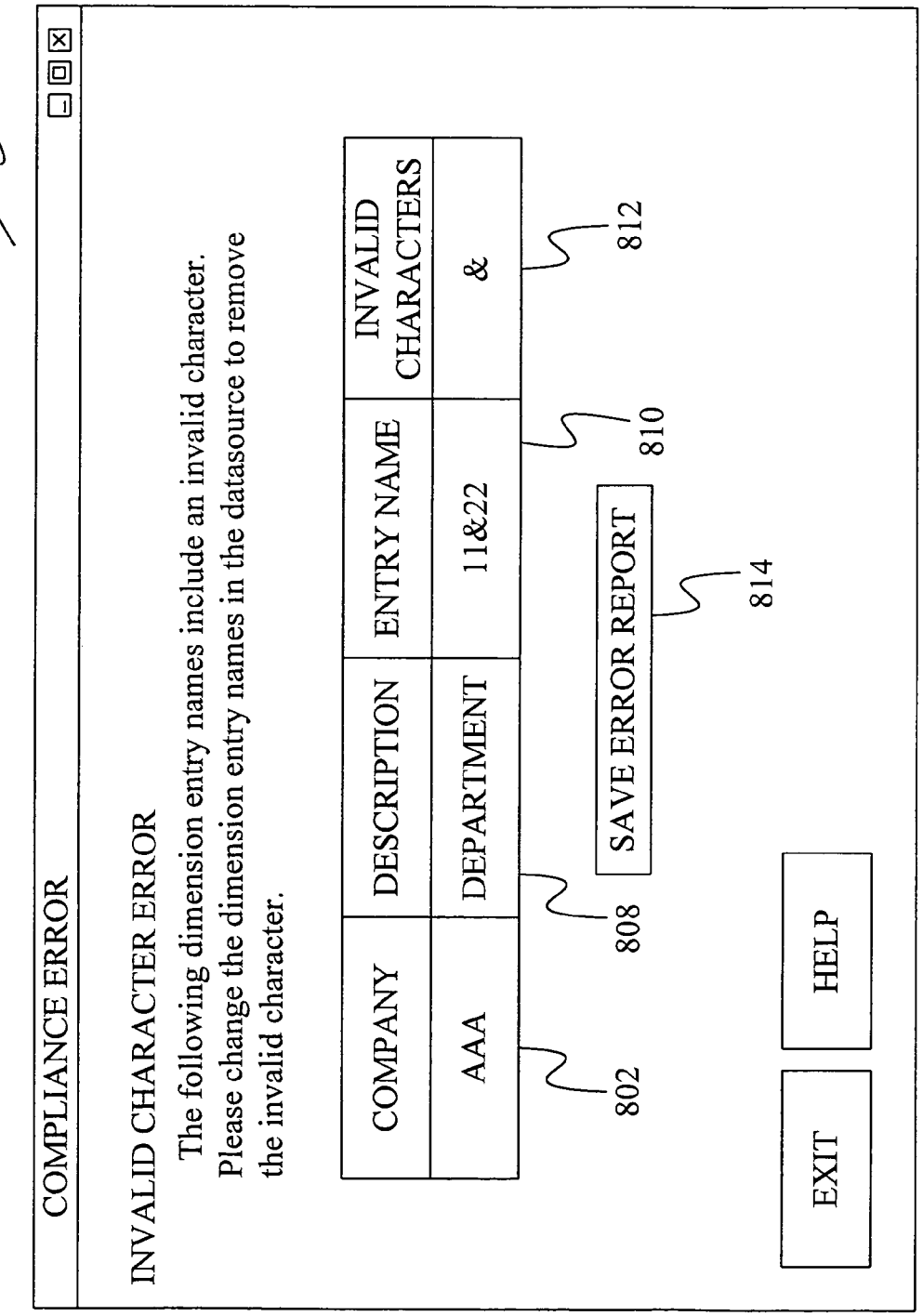
FIG. 8 is a display screen for an invalid character compliance error.

An example of an error compliance screen is shown in FIG. 8 for an invalid character error. In error compliance screen 800, the user is provided with an identification of the company 802, a dimension description 808, an entry name 810 that includes the invalid character, and an identification of the invalid character 812. As noted above, entry name 810 is taken from DIMENSIONS table 500 and dimension description 808 is taken from DIMENSION DESCRIPTION field 608 of DATA DIMENSION LENGTH table 600.

To correct the invalid character error, the user must access the tables in dimension-based tables 203 and change the entry name so that it does not include the invalid character. This is typically done using a tool associated with financial program 206 so that the change in the entry name can be propagated through all of the necessary tables in dimension-based tables 203. To assist the user, an export button 814 is provided that will export the error log to an output format such as a spreadsheet so that the user has access to the error log while changing the entry names in dimension-based tables 203.

Figure 9:
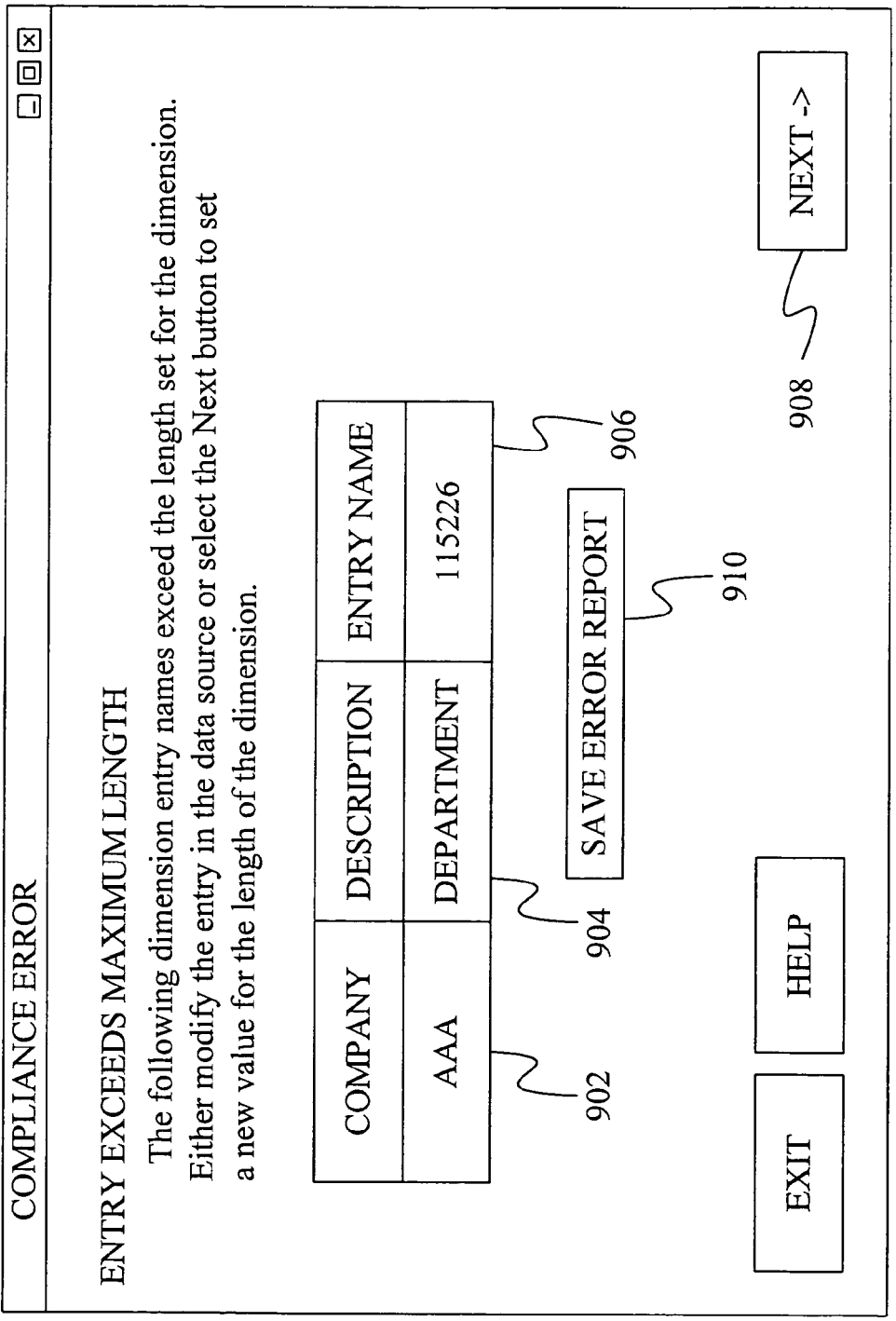
FIG. 9 is a display screen for an entry exceeds maximum length compliance error.

FIG. 9 provides an example of an error compliance screen 900 that is presented to the user when an entry name exceeds the maximum length set in DATA DIMENSION LENGTH table 600. In screen 900, the user is told that one or more entry names exceed the length set for their dimension. The user must either modify the entry in the DIMENSIONS table so that its length is below the length set in table 600 or they may select the next button to set a new value for the length of the dimension. Pressing the next button will cause a screen to be displayed for setting the lengths of the dimensions. This screen is discussed further below. To assist the user, an export button 910 is provided that will export the error log to an output format such a spreadsheet.

In FIG. 9 the entry that has an entry name that is too long is identified by the company 902, the dimension description 904 and the entry name 906 of the entry. The company is the company associated with the data area ID value found in DATAAREAID field 508 of the entry. The description 904 is the dimension description found in DIMENSION DESCRIPTION filed 608 of DATA DIMENSION LENGTH table 600 for the dimension code of the entry, and the entry name is taken from the ENTRY NAME field 504 of the entry.

Figure 10:
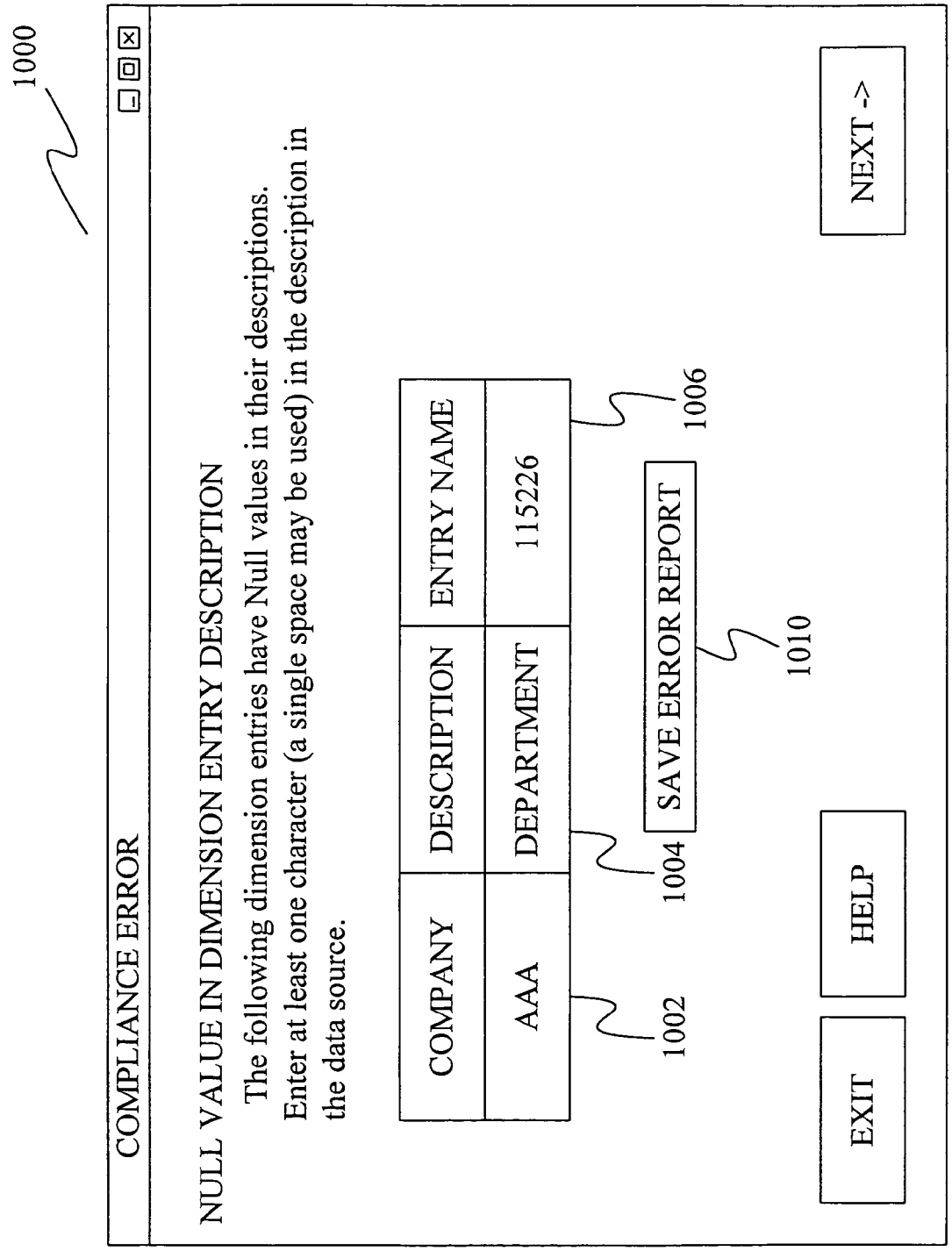
FIG. 10 is a display screen for a null value in entry description compliance error.

FIG. 10 provides an example of a compliance error screen 1000 that is presented to a user when an entry description in an entry includes a null value. The entry with the null value is identified in screen 1000 by a company identifier 1002, a description identifier 1004, and an entry identifier 1006. Company identifier 1002 is the name of the company associated with the data area ID in the DATAAREAID field of the entry. Description identifier 1004 is the description in DIMENSION DESCRIPTION field 608 of DATA DIMENSION LENGTH table 600. Entry name identifier 1006 is the entry name in ENTRY NAME field 504 of the entry.

To assist the user, an export button 1010 is provided that causes the error log to be exported to a spreadsheet file so that the user may print out the spreadsheet when making changes to the entry description. To correct an entry description that has a null value, the user must change the description in DIMENSIONS table 500. This is typically done using a tool associated with financial program 206 so that the change can be propagated to all of the tables necessary in dimension-based tables 203.

Step 306 temporarily ends the process until the user has corrected the errors in the dimensions-based tables. Once the errors have been corrected, the user begins the process again at step 300 and repeats step 302 and 304. When there are no longer any errors at step 304, the process continues at step 308 where the system allows the user to verify/change the lengths for the dimensions associated with the company.

Figure 11:
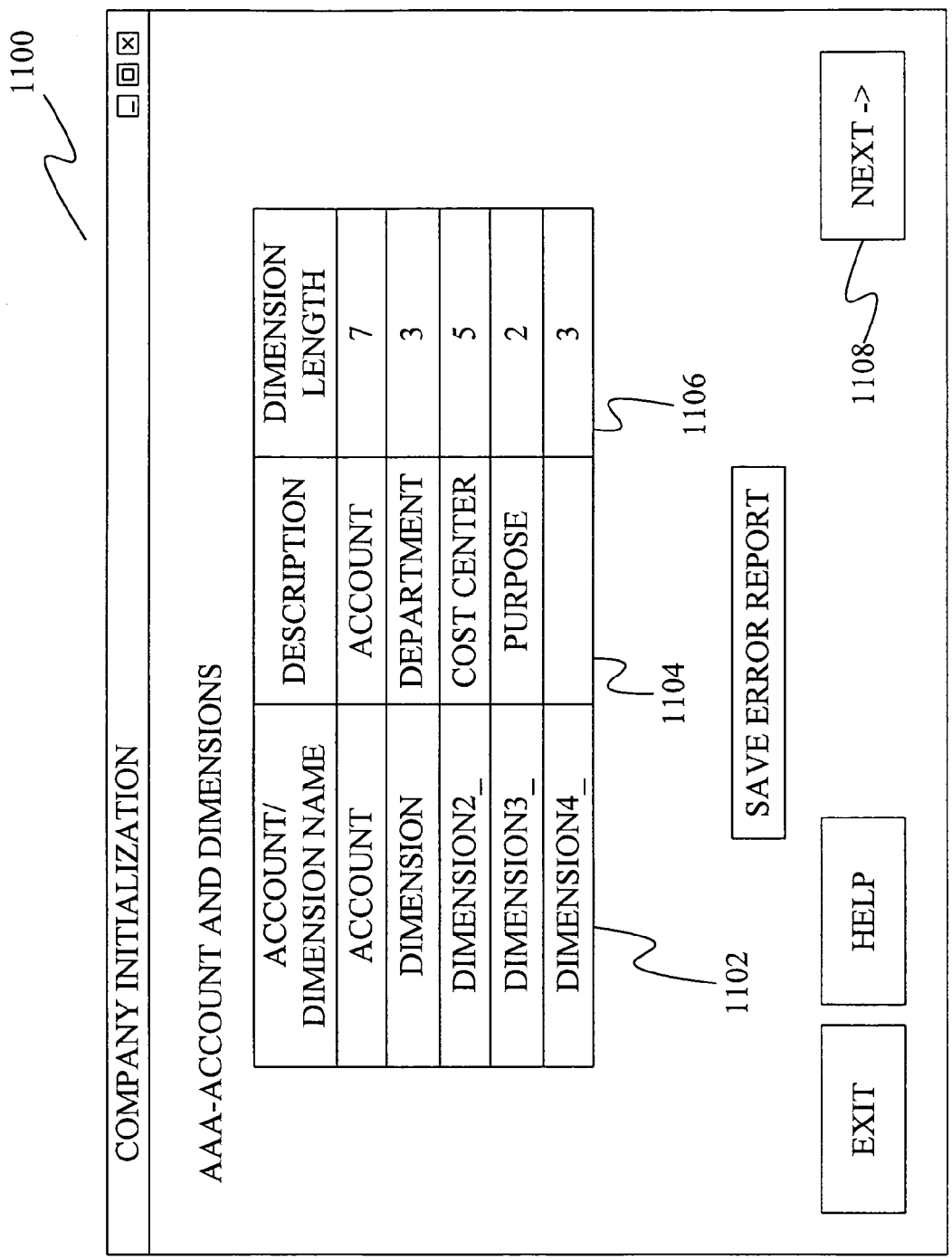
FIG. 11 is a display screen for verifying and changing the maximum lengths of dimension entry names.

FIG. 11 provides a display screen 1100 that displays the dimensions associated with the company and allows the user to change the dimension length associated with each dimension. This is the same screen that is displayed to the user when they press Next button 908 in the compliance error screen of FIG. 9.

In display screen 1100, a table is provided with an account/dimension name identifier 1102, a description identifier 1104 and a dimension length identifier 1106. Account/dimension name 1102 is taken from FIELDNAME field 606 of DATA DIMENSION LENGTH table 600 for a dimension associated with the data area ID of the selected company. Description identifier 1104 is taken from DIMENSION DESCRIPTION field 608 of table 600 and the dimension length 1106 is populated with values from MAXLENGTH field 610 of table 600. The table in display screen 1100 is populated by looking for every entry in table 600 for the selected company using DATAAREAID field 602.

After the user has set the dimension lengths in dimension length identifier field 1106, they press the next button 1108. Upon the pressing of button 1108, the system validates the lengths of the entries at step 310 of FIG. 3. This validation involves ensuring that the user has not reduced the length of any of the dimensions and ensuring that the new dimension length is larger than the largest entry name for the dimension in DIMENSIONS table 500. If the user attempts to reduce the size of the dimension length, they are returned to display screen 1100 with an error message indicating that the dimension length cannot be reduced in size. If the chosen dimension length is smaller than an entry name for the dimension in DIMENSIONS table 500, the error is logged with an identification of the entry that has an entry name larger than the set dimension length.

At step 312, the system determines if there are errors in the error log. If there are errors in the error log, error compliance screen 900 is displayed, which lists all of the dimension entries that have entry names larger than the dimension lengths set in screen 1100. When the user selects next button 908 in FIG. 9, they are returned to screen 1100, where they are allowed to modify the dimension lengths. Thus, the process of FIG. 3 returns from displaying an error compliance screen at step 314 to step 308 to allow the user to verify/change the lengths for the dimensions.

When there are no longer any errors at step 312, the process of FIG. 3 continues at step 316 where the user is allowed to select or create a new account code structure to edit. Because separate account codes are generally constructed for different entities within a company, these structures are alternatively referred to as entity structures or simply as entities.

Figure 12:
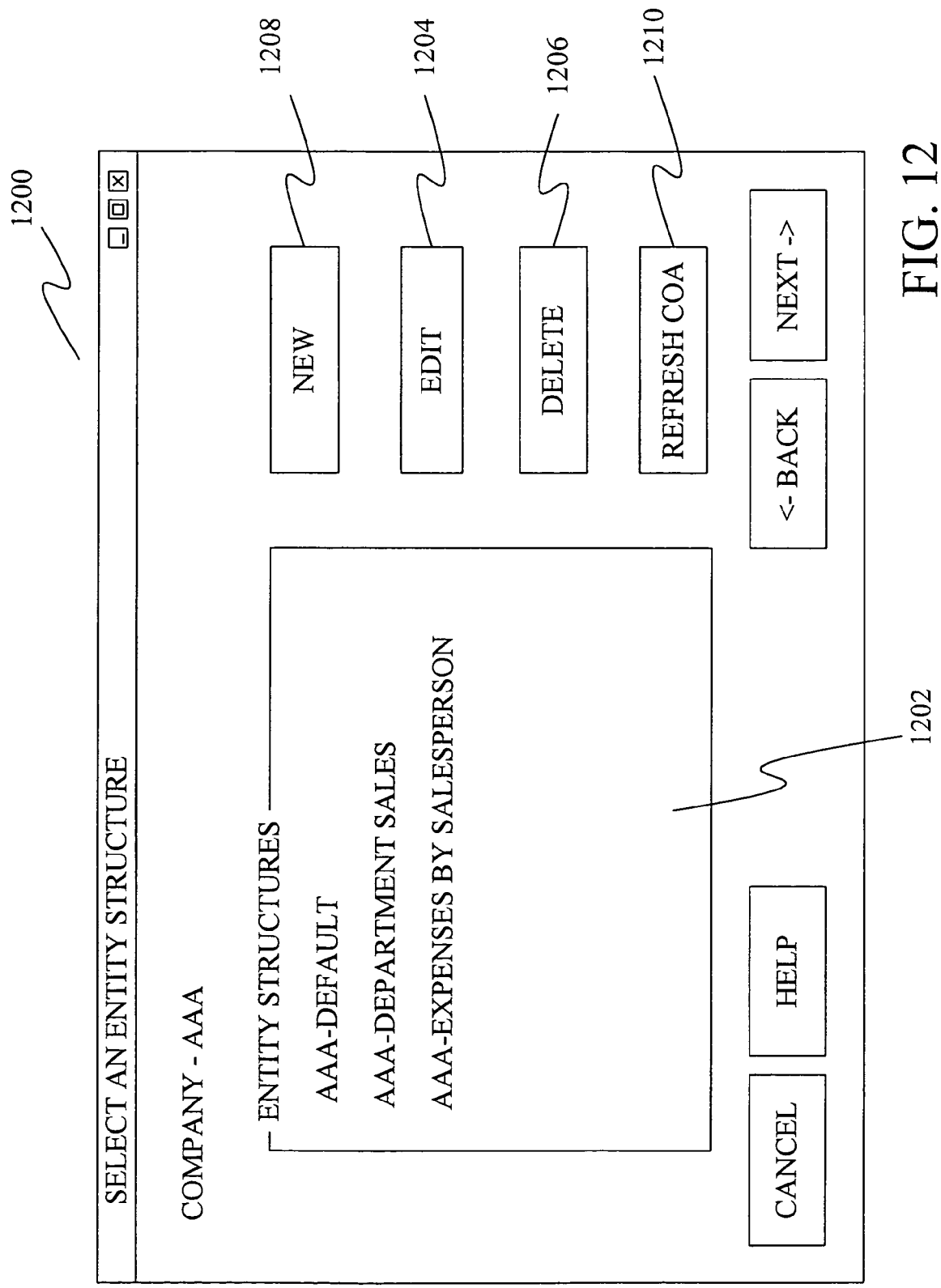
FIG. 12 is a display screen for selecting an account code structure to edit.

FIG. 12 provides a display screen 1200 that is displayed to the user to allow them to select an existing account code structure to edit or delete or to select an option to create a new account code structure.

To edit an existing account code structure, the user highlights one of the account code structures provided in a list 1202. The user then selects edit button 1204. The user may also delete an account code structure that has been highlighted by pressing delete button 1206. If a user wishes to create a new account code structure they simply press new button 1208.

Figure 13:
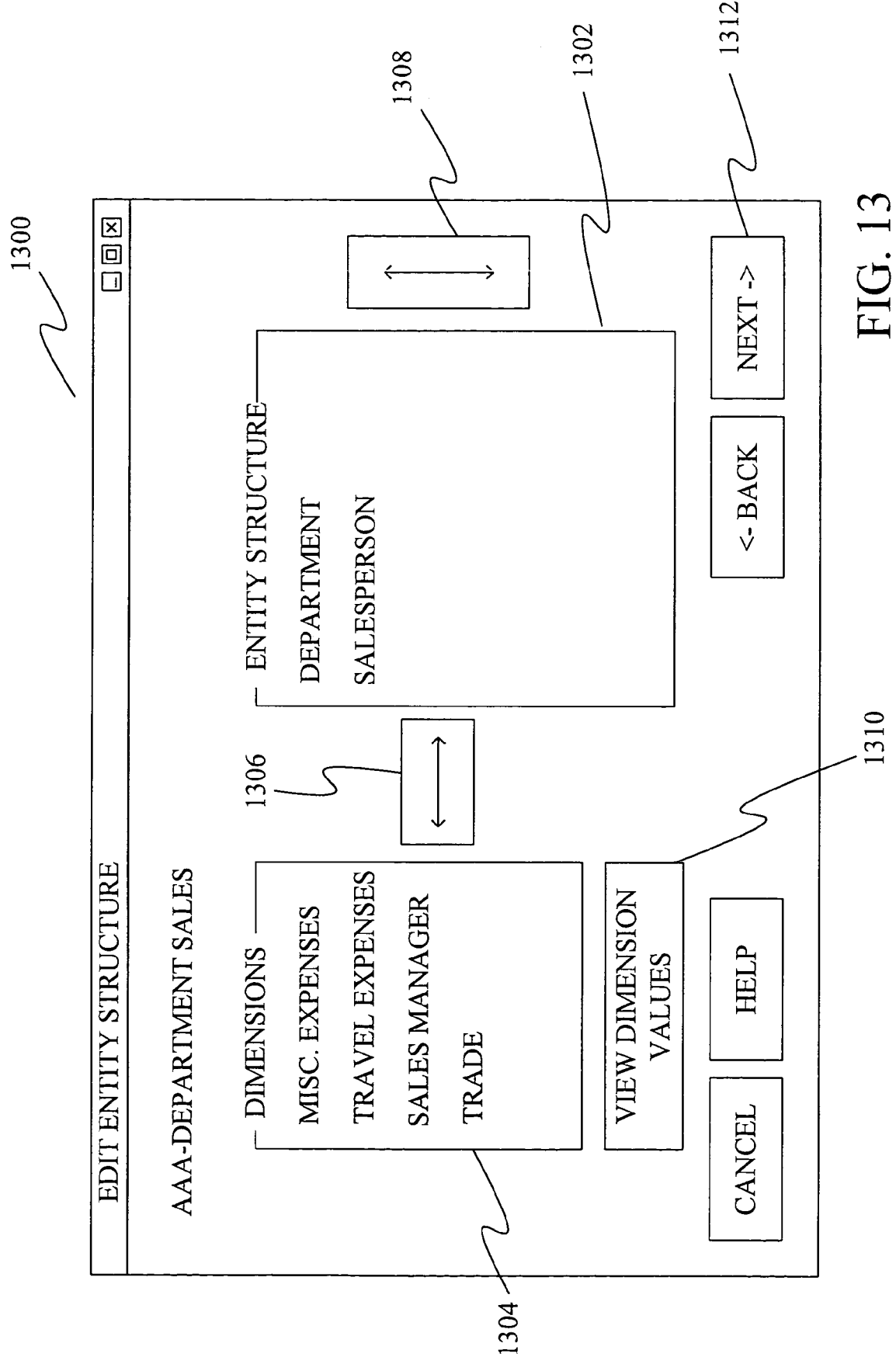
FIG. 13 is a display screen for editing an account code structure.

If the user presses new button 1208 or edit button 1204, the system provides the user with display screen 1300 of FIG. 13 and allows the user to edit the account code structure as shown in step 318 of FIG. 3. In display screen 1300, the dimension descriptions of the current dimensions that form the selected account code structure are found in display box 1302. If a new account code structure is being built, box 1302 will be empty. The dimensions are organized in box 1302 such that the first dimension in the account code is at the top of list box 1302 and the subsequent dimensions are found in order below the top dimension.

Display screen 1300 also provides a list 1304 of available dimensions that may be added to the account code structure. The names of the available dimensions are taken from DIMENSION DESCRIPTION field 608 of DATA DIMENSION LENGTH table 600. In particular, all of the dimensions stored in DATA DIMENSION LENGTH table 600 for the selected company are displayed in box 1304, with the exception of those that have already been placed in box 1302.

A user may add a dimension from box 1304 to box 1302 pressing button 1306 after highlighting the dimension that they wish to add to box 1302. A user may remove a dimension from box 1302 and place it back in box 1304 by highlight the dimension in box 1302 and then pressing button 1306.

When a dimension is added to box 1302, it is added to the bottom of the list. A user may reorder the dimensions in box 1302 by highlighting a dimension and pressing button 1308 to move the dimension vertically. The final order of the dimensions in box 1302 will be used to form the account code structure.

To assist the user when determine which dimensions to include in box 1302, a View Dimension Values button 1310 is provided on display screen 1300. When the user presses View Dimension Values button 1310 for a highlighted dimension in box 1304, a window with sample dimension entry names for the selected dimension is displayed. This helps the user to recognize what the dimension actually represents.

When the user has selected and ordered the dimensions as desired in box 1302, the user presses next button 1312.

Figure 14:
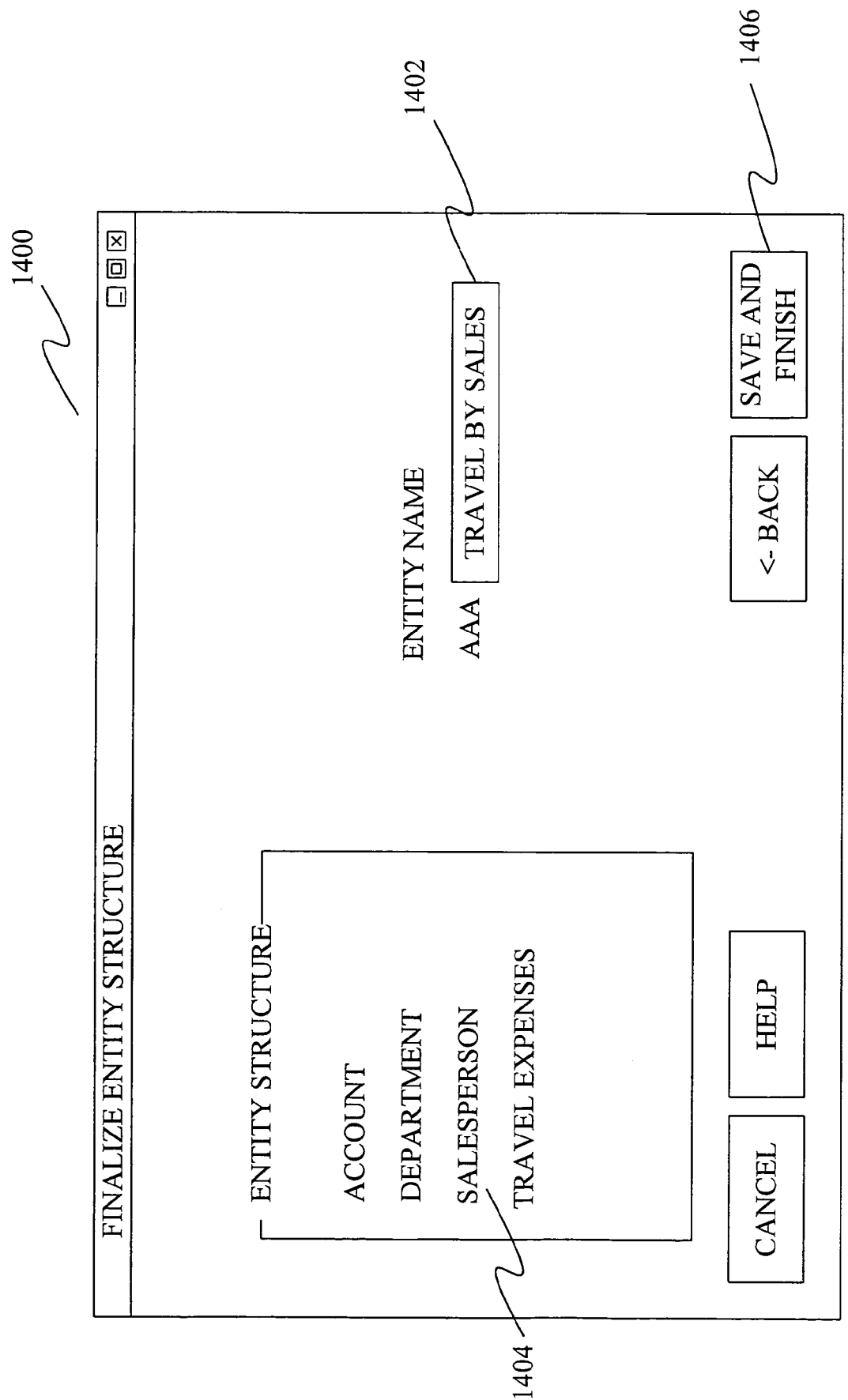
FIG. 14 is a display screen for saving an account code structure.

Upon receiving the next button input, the system displays screen 1400 of FIG. 14. In display screen 1400, the user is allowed to name the account code structure by typing in the name in box 1402. The name provided for the account code structure is referred to as an entity name and under one embodiment is always preceded by the company name for the company selected for this account code structure. Thus, for example, in FIG. 14, the full entity name would be "AAA-TRAVEL BY SALES". In display screen 1400, the structure of the account code is shown in entity structure box 1404. After the user has entered the name and pressed "Save and Finish" button 1406, the method of the present invention adds the account code structure to database 204 at step 320.

Step 320 involves creating entries in two tables in mapping additions 202. The first entries are in ENTITY table 1500 of FIG. 15. ENTITY table 1500 includes an ENTITY NUM field 1502, an ENTITY CODE field 1504 and an ENTITY DESC. field 1506. Under one embodiment, a value for the ENTITY NUM field is automatically assigned for each new entity added to ENTITY table 1500. The ENTITY CODE field receives the data area ID for the company associated with this entity. ENTITY DESC. field 1506 receives the name of the account code structure provided in display screen 1400.

The actual structure of the entity is placed in a SEGMENT CTRL table 1600 of FIG. 16. In SEGMENT CTRL table 1600, each row represents a dimension within a single entity, or account code structure. Table 1600 includes ENTITY NUM field 1602, SEG-NUM field 1604, DIMENSION CODE field 1606, COLUMN NAME field 1608, SEG DESC. field 1610, SEG START POS. field 1612, and SEG LENGTH field 1614.

ENTITY NUM field 1602 identifies the entity associated with this row using the entity number of ENTITY NUM field 1502 of table 1500. SEG-NUM field 1604 identifies which segment in the entity is represented by this row, where the segments are numbered from left to right in the entity structure. DIMENSION CODE field 1606 provides the dimension code from DIMENSION CODE field 604 of table 600 for the dimension that is placed at this segment in the entity. COLUMN NAME field 1608 provides the field header name for this dimension in dimension-based tables 203. For example, one of the names in COLUMN NAME 1608 could be "DIMENSION2_", which is field header 702 in LEDGERBALANCESDIM table 700 of FIG. 7.

SEG DESC. field 1610 provides the dimension description name for the dimension in this segment, where the dimension description name is the same as the dimension description names in DIMENSION DESCRIPTION field 608 of table 600. SEG START POS. field 1612 indicates the character position within the entity structure where this segment begins. SEG LENGTH field 1614 indicates the length of this segment, which is taken from MAXLENGTH field 610 of table 600. In table 1600, every segment of the entity is listed as a separate row with the same entity number.

After the entity structure (account code structure) has been added to the tables of mapping additions 202, mapping tool 200 builds a local account code table of active account codes at step 322. This local table of account codes reduces the search space for possible account codes when building reports. An example of a local account code table 1700 is shown in FIG. 17.

To produce an entry for ACCOUNT CODE table 1700, mapping tool 200 accesses LEDGERBALANCESDIM dim table 700 of FIG. 7. It searches for any entry that has a balance value, such as a value in DEBITMST field 710 or CREDITMST field 712, and retrieves the account number from ACCOUNTNUM field 704 and all of the values for dimensions associated with the new account code structure. The values for the dimensions are located in the dimension fields such as DIMENSION field 706, DIMENSION2_field 702, and DIMENSION10_field 708.

The exact form of the account number is placed in ACCT_CODE ORIG field 1708. The account number is placed exactly as it appears in LEDGERBALANCESDIM table 700, including any leading or trailing spaces so that direct comparisons to the account numbers stored in dimension-based tables 203 can be made when generating reports.

The account code is also stripped of its leading and trailing zeros and stored in NAT_SEG field 1710 and SEG01 CODE field 1712. Each of the retrieved dimension values are stored in a respective dimension field. For example, the value from DIMENSION2 field 702 is stored in SEG02 CODE field 1714.

The entity number for the account code structure is stored in ENTITY NUM field 1704. The full account code is then constructed by combining the account number and dimensions according to the account code structure stored in SEGMENT CTRL table 1600. In addition, the descriptions in SEG DESC. field 1610 are appended together based on the order of the segments in the entity structure to form an account code description that is stored in ACCT_DESC. field 1706.

The values in ACCCOUNT CODE table 1700 may be refreshed from time to time without constructing the entity structure from scratch. To refresh the entries in ACCOUNT CODE table 1700 for an entity structure, the entity structure is highlighted in screen 1200 and REFRESH COA button 1210 is pressed. LEDGERBALANCESDIM table 700 is then searched for entries that have balance values and the values of the dimensions associated with the selected entity are returned and used to construct account codes for ACCOUNT CODE table 1700.

Once the account codes have been added to account code table 1700, they may be used for generating reports. In particular, segment-based reporting tool 208 can set ranges and masks based on rigid rules for the account codes, since the constructed account codes have fixed lengths for the various segments and do not include any invalid characters. A reference to an account code is converted into a reference to the dimension tables by locating the entity associated with the account code in account code table 1700, and retrieving the respective column names from table 1600 for that entity. These column names identify the fields in the dimension-based tables 203 for the various segments of the account code. The values in these segments can then be used to search the tables in dimension-based tables 203 to collect data for the reports.

Thus, the present invention provides a mapping tool that allows a segment-based reporting tool 208 to access and generate reports from a dimension-based database, thereby avoiding having to write a specialized reporting tool for the dimension-based database.

Although the embodiments above describe the mapping additions as being added to the database associated with the dimension-based financial program, those skilled in the art will recognize that the tables in the mapping addition could exist in a separate database from the database for the dimension-based financial program.

Although the present invention has been described with reference to particular embodiments, workers skilled in the art will recognize that changes may be made in form and detail without departing from the spirit and scope of the invention.

What is claimed is:

1. A method comprising:
    accessing a dimension-based accounting database that defines multiple dimensions;
    selecting a plurality of dimensions from the dimension-based accounting database for a segment-based account code structure;
    defining an order for the plurality of selected dimensions;
    defining the segment-based account code structure based on the order; and
    a processor constructing a plurality of account codes based on the segment-based account code structure and the dimension-based accounting database by:
        searching a table in the dimension-based accounting database comprising a separate dimension column for each dimension in the plurality of selected dimensions and at least one balance column for rows in the table that have a value in the at least one balance column;
        for each row that has a value in the at least one balance column, retrieving a dimension value from a respective dimension column in the table for each dimension in the plurality of selected dimensions;
        for each row that has a value in the at least one balance column, placing the values from the dimension columns in the order defined by the segment-based account code structure to construct an account code, and
        storing the account codes.

2. The method of claim 1 wherein selecting a plurality of dimensions comprises validating values associated with the dimensions using rules associated with segment-based reporting.

3. The method of claim 2 wherein validating a value comprises determining whether the value includes a character other than a number that is not valid in an account code.

4. The method of claim 2 wherein validating a value comprises determining whether the length of the value exceeds a length set for the value.

5. The method of claim 2 wherein validating a value comprises determining whether the value is null.

6. The method of claim 2 further comprising determining that a value violates a rule associated with segment-based reporting and providing an error message.

7. The method of claim 2 wherein validating values associated with dimensions comprises:
    selecting a company;
    searching a database table having a column containing identifiers for a plurality of companies and locating rows that contain an identifier for the selected company;
    for each located row, retrieving a value for a dimension; and
    validating the retrieved values.

8. The method of claim 7 wherein validating the retrieved values comprises:
    searching a data dimension length table for a row containing the identifier for the selected company and the dimension for the retrieved value;
    retrieving a maximum length from the row containing the identifier for the selected company and the dimension for the retrieved value;
    determining whether the number of characters in the retrieved value exceeds the retrieved maximum length.

9. The method of claim 1 wherein defining the account code structure comprises generating table entries that link segments of the account code structure to dimension headings in tables in the dimension-based accounting database.

10. A computer storage medium having stored thereon computer-executable instructions for performing steps comprising:
    constructing account codes based on a segment-based account code structure and a dimension-based database by:
        searching a table in the dimension-based database comprising a column for each dimension in a plurality of dimensions and at least one balance column for rows in the table that have a value in the at least one balance column;
        for each row that has a value in the at least one balance column, retrieving a dimension value from a dimension column in the table for each dimension in the plurality of dimensions;
        placing the values from the dimension columns in an order defined by the segment-based account code structure to construct an account code, and
        storing the account codes.

* * * * *